(12) United States Patent
Moore

(10) Patent No.: US 8,296,897 B2
(45) Date of Patent: Oct. 30, 2012

(54) CENTRAL VACUUM FOR VEHICLES

(76) Inventor: Kenneth Charles Moore, Johnson, RI (US)

(*) Notice: Subject to any disclaimer, the term of this patent is extended or adjusted under 35 U.S.C. 154(b) by 618 days.

(21) Appl. No.: 12/456,784

(22) Filed: Jun. 23, 2009

(65) Prior Publication Data

US 2010/0005612 A1    Jan. 14, 2010

Related U.S. Application Data

(60) Provisional application No. 61/132,921, filed on Jun. 24, 2008.

(51) Int. Cl.
*B60S 1/64* (2006.01)
(52) U.S. Cl. ............... 15/313; 15/314; 15/315; 15/323
(58) Field of Classification Search ............... 15/313, 15/314, 315, 323
See application file for complete search history.

(56) References Cited

U.S. PATENT DOCUMENTS

| | | | |
|---|---|---|---|
| 2005/0011035 A1* | 1/2005 | Rukavina et al. | 15/313 |
| 2006/0000047 A1* | 1/2006 | Beechie | 15/314 |
| 2008/0092323 A1* | 4/2008 | Smith et al. | 15/314 |

* cited by examiner

*Primary Examiner* — Robert Scruggs
(74) *Attorney, Agent, or Firm* — Barlow, Josephs & Holmes, Ltd.

(57) ABSTRACT

The present invention relates to a central vacuum cleaning system for vehicles. The unit comprises a vacuum generating alternating current motor, a built-in direct current to alternating current inverter and a removable dirt cup containing a filter and screen. The unit has a built-in in-take port, which has an auto switch that turns the unit on when the vacuum hose is plugged in and shuts the unit off when the vacuum hose is unplugged. The unit also has a remote in-take and remote auto switch capability so you can plug the vacuum hose into a more convenient location in the interior of the vehicle. The unit can be mounted horizontally or vertically. The unit can be installed in any vehicle consisting of a 12-volt direct current battery. The vehicle does not need to have an alternating current inverter installed separately to operate.

12 Claims, 22 Drawing Sheets

Fig.5
 Filter ㉑
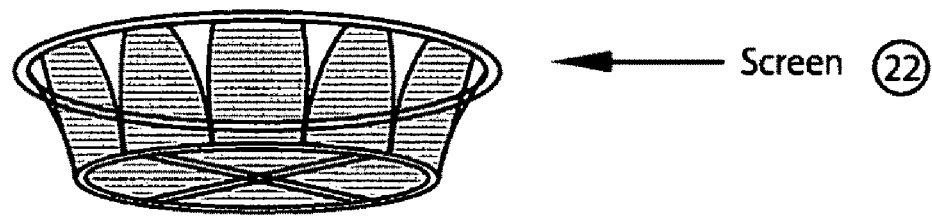 Screen ㉒
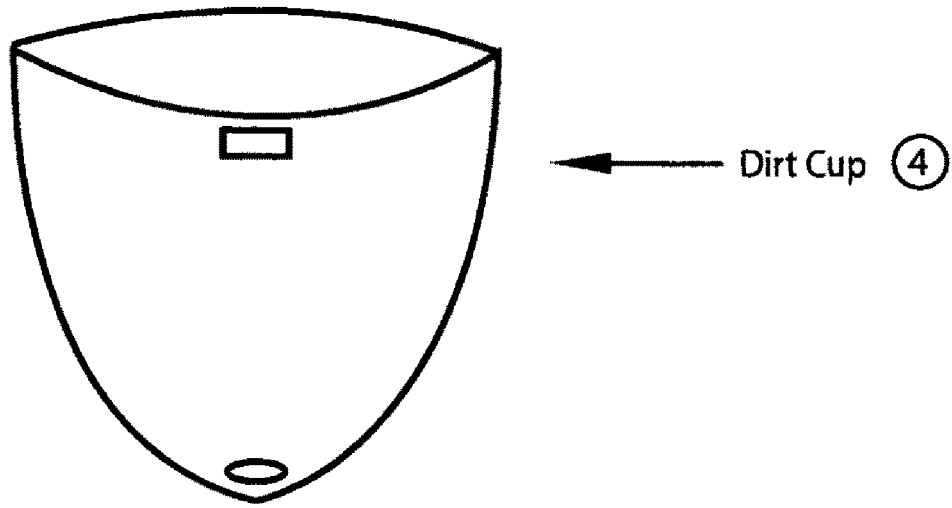 Dirt Cup ④

Mounting Bracket Front View

CENTRAL VACUUM FOR VEHICLES

This application claims the priority benefit of U.S. Provisional Patent Application Ser. No. 61/132,921 filed Jun. 24, 2008.

BACKGROUND OF THE INVENTION

1. Field of the Invention

The present invention relates to a vacuum cleaning system and more particularly pertains to a unit containing all components. The DC to AC inverter is in the same housing as the AC motor, dirt cup and filter making installation into a vehicle much more practical. The present devise comprises a direct in-take port. It also gives the option of a Remote In-Take Port 2. Description of Prior Art The use of vacuum cleaning systems is known in the prior art. Various vacuum cleaning systems are described in U.S. Pat. No. 6,813,805 U.S. Pat. No. 6,735,810 U.S. Pat. No. 5,829,091 U.S. Pat. No. 6,813,805 U.S. Pat. No. 7,152,272 U.S. Pat. No. 6,128,804 U.S. Pat. No. 7,266,859 U.S. Pat. No. 6,148,472 While theses devices fulfill their respective, particular objectives and requirements. The aforementioned patents do not disclose installing all of their components in one unit. Having the AC to DC inverter small enough to incorporate into the same housing as the AC motor dirt cup & filter. It is what makes this invention unique.

BRIEF DESCRIPTION OF DRAWINGS

FIG. 5 is an exploded perspective view of the filter assembly of the dirt separation system.

SUMMARY OF INVENTION

Figure 1:
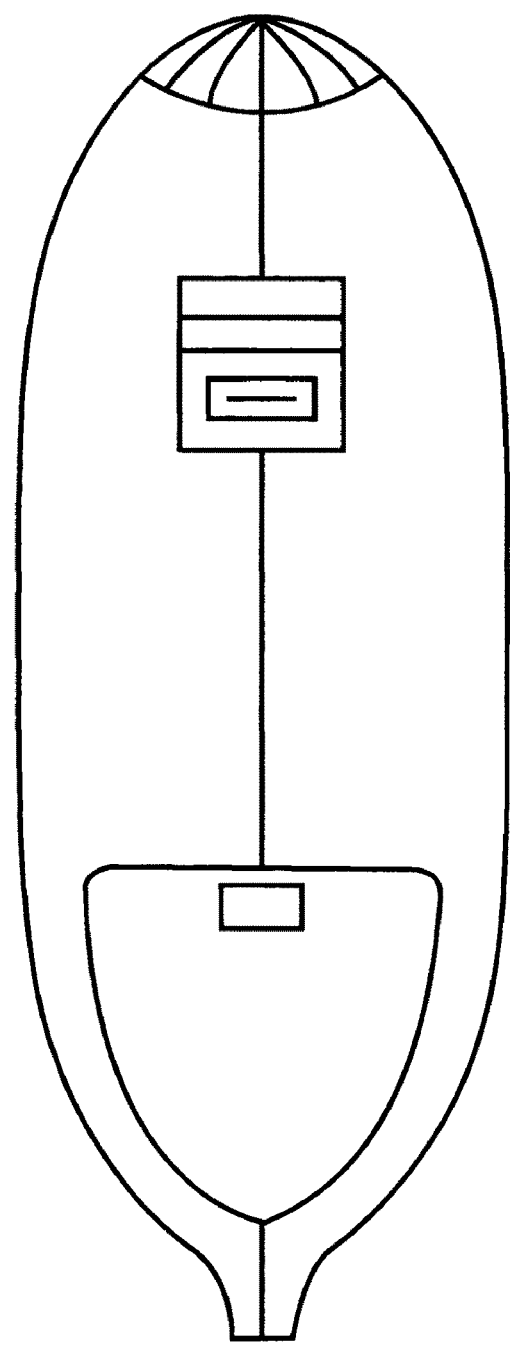
FIG. 1 is a perspective view of a vacuum cleaner unit which incorporates the features of the present invention therein.
Figure 2:
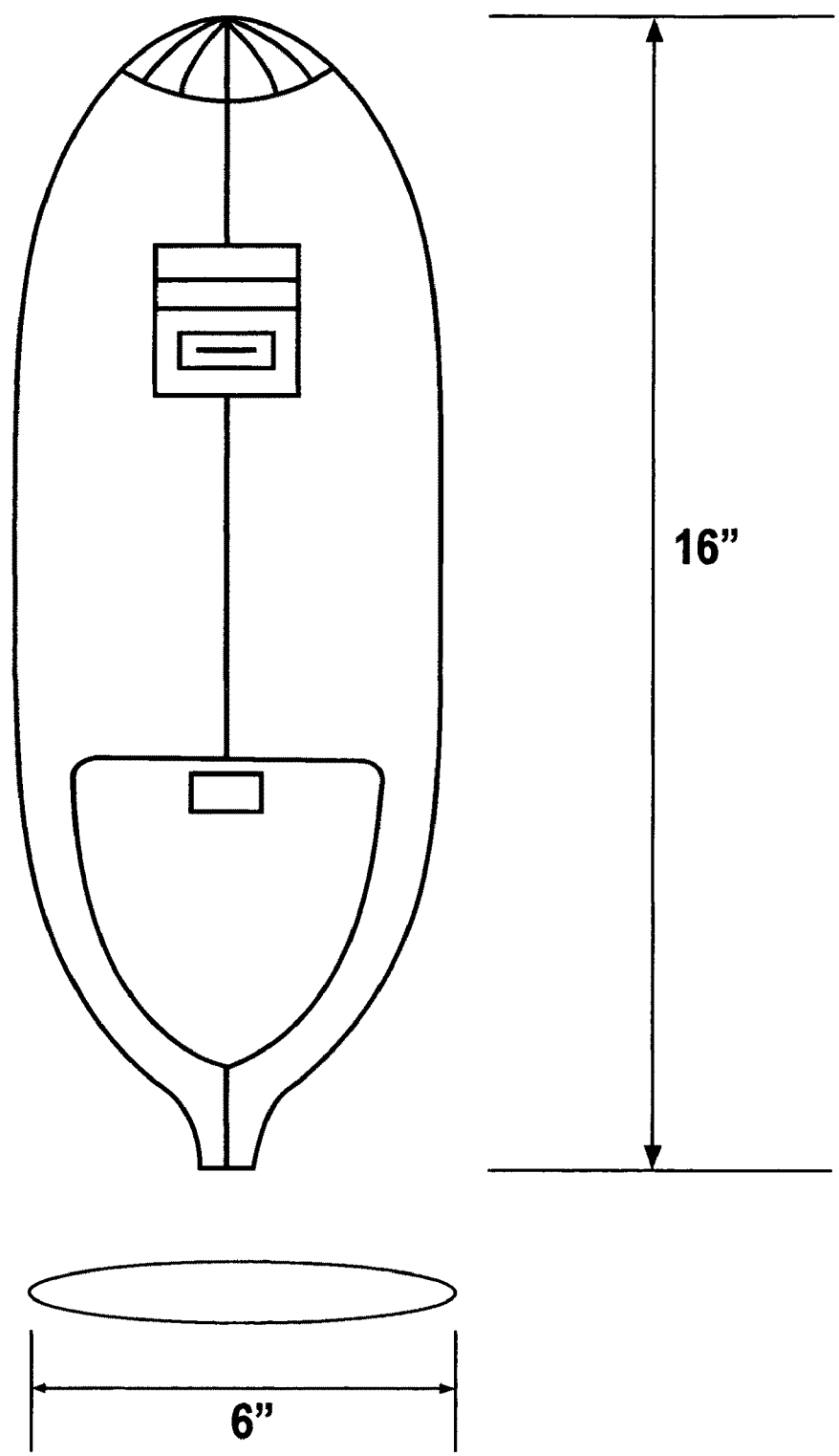
FIG. 2 is a view similar to FIG. 1 but showing actual size
Figure 3:
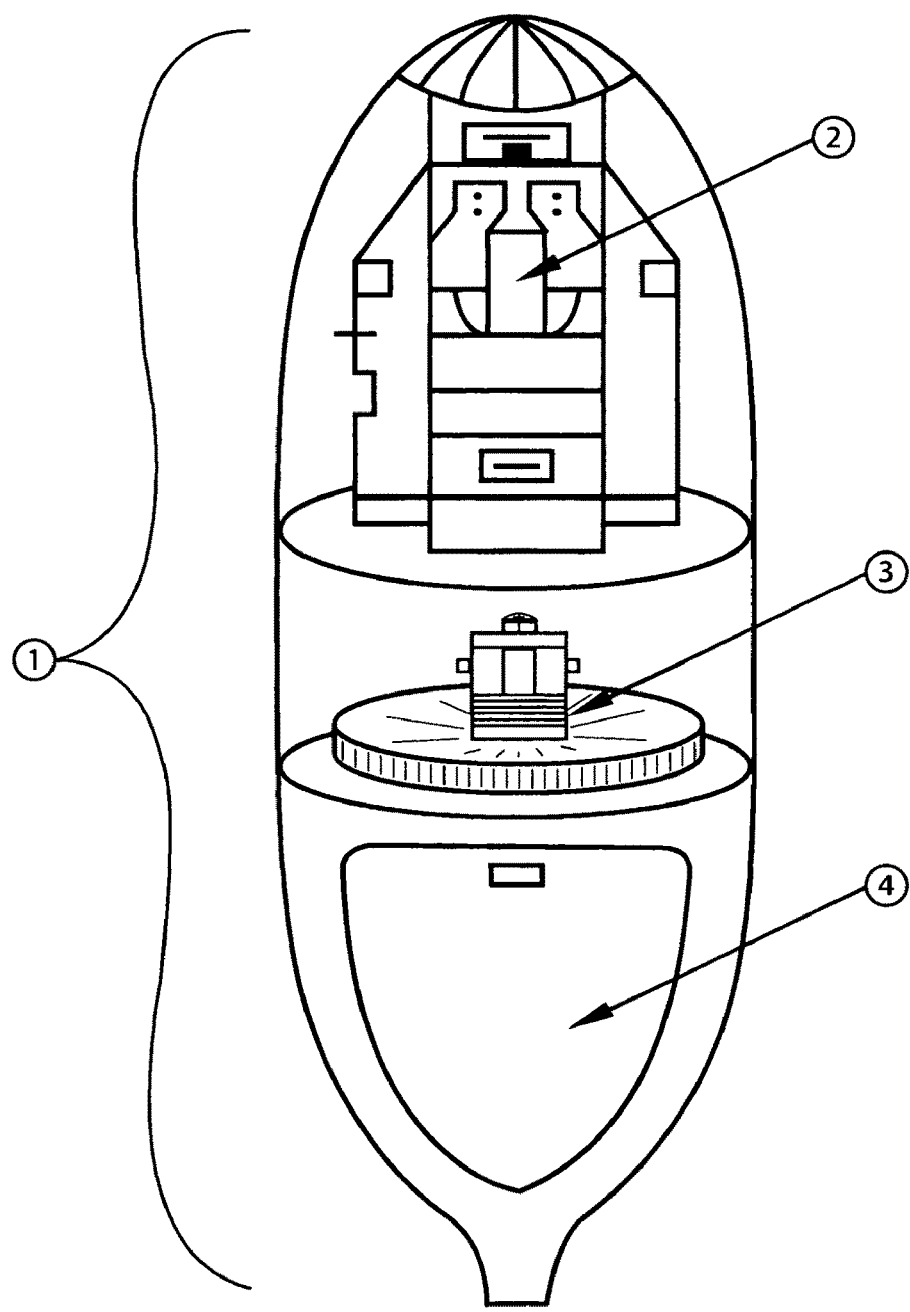
FIG. 3 is a drawing showing the major components of the unit.
Figure 4:
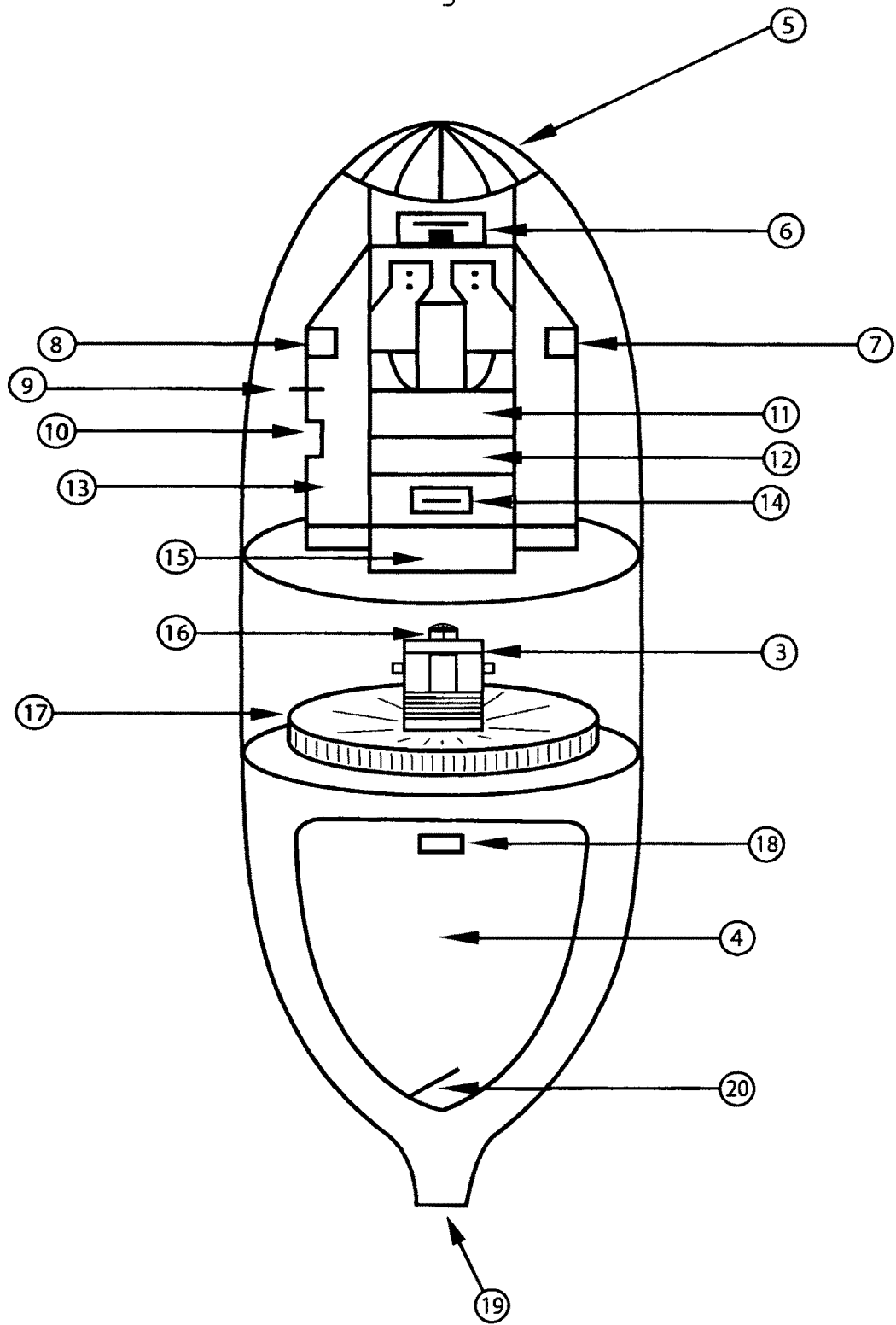
FIG. 4 is a fragmentary cross sectional view of the vacuum unit assembly
Figure 6:
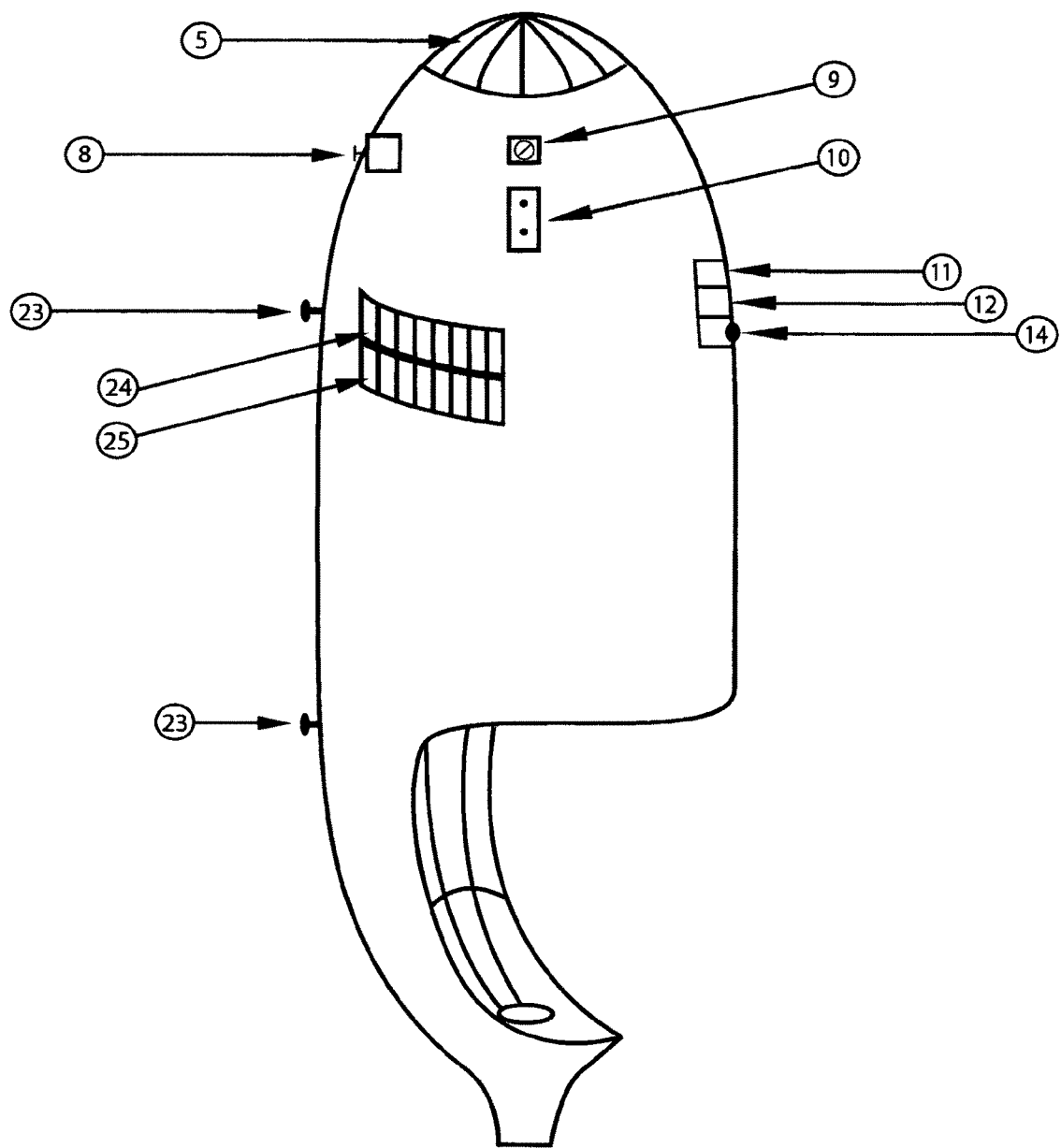
FIG. 6 is a fragmentary left side view of the vacuum unit without the dirt separation system connected
Figure 7:
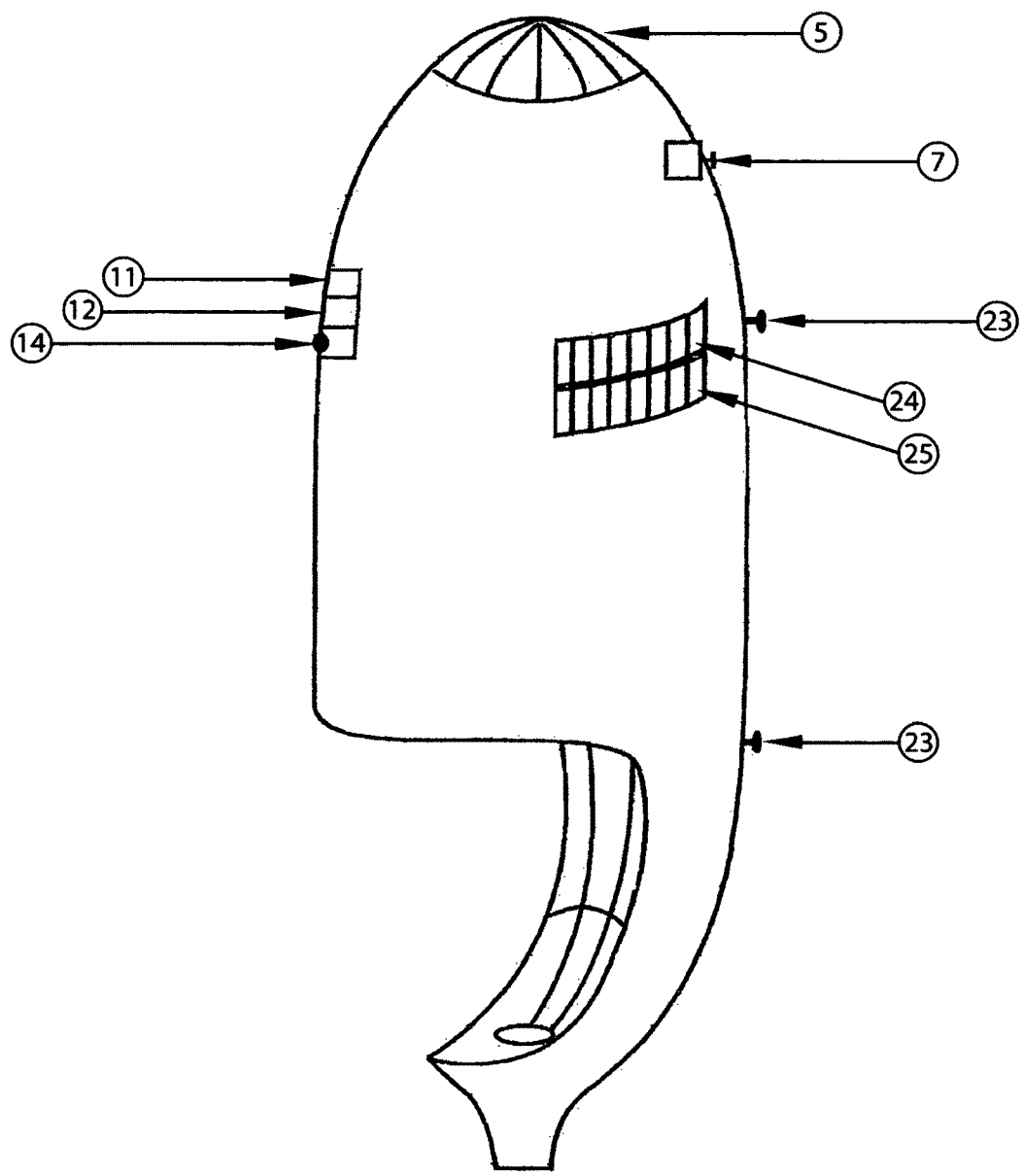
FIG. 7 is a fragmentary right side view of the vacuum unit without the dirt separation system connected
Figure 8:
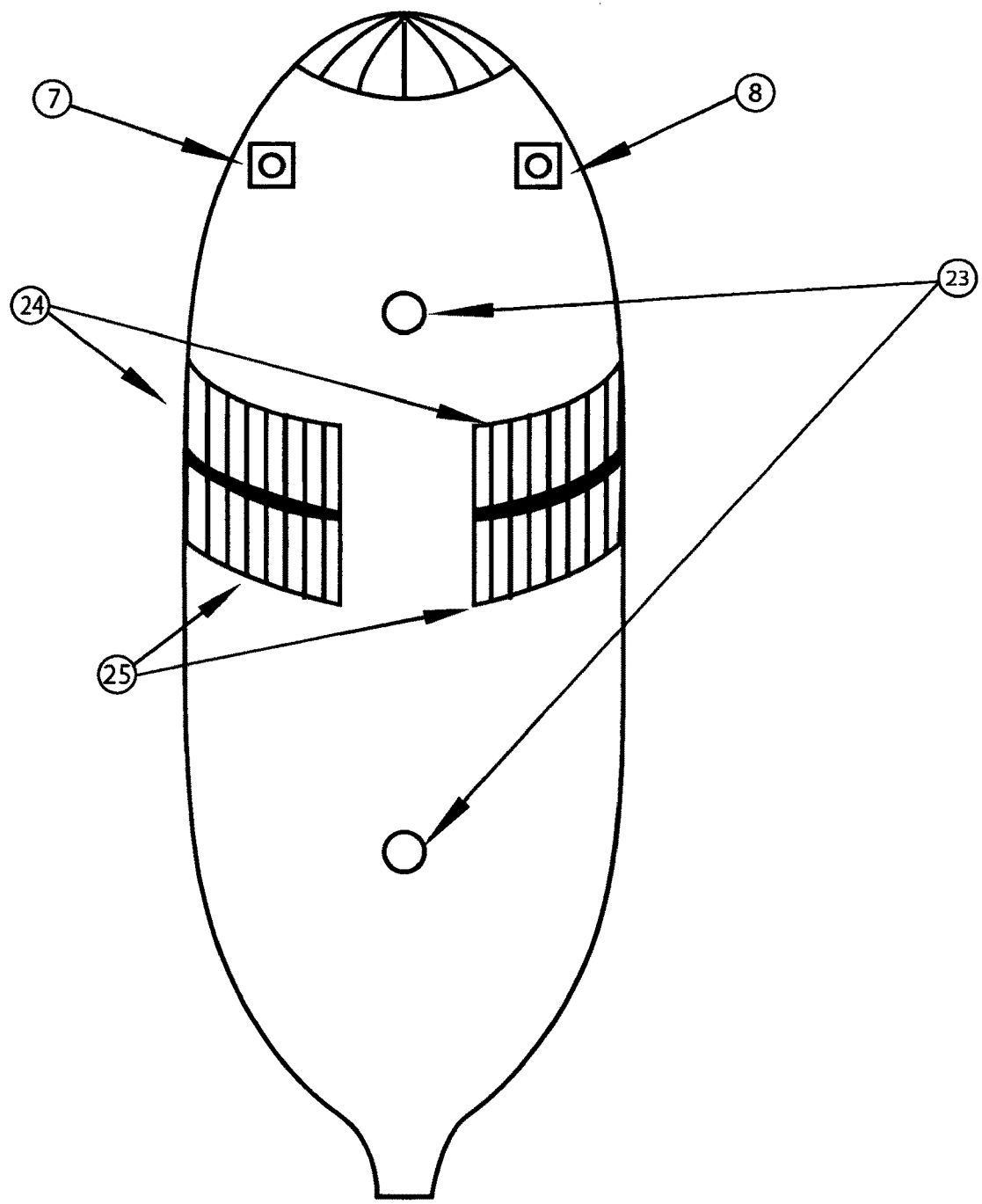
FIG. 8 is a back view of the vacuum unit
Figure 9:
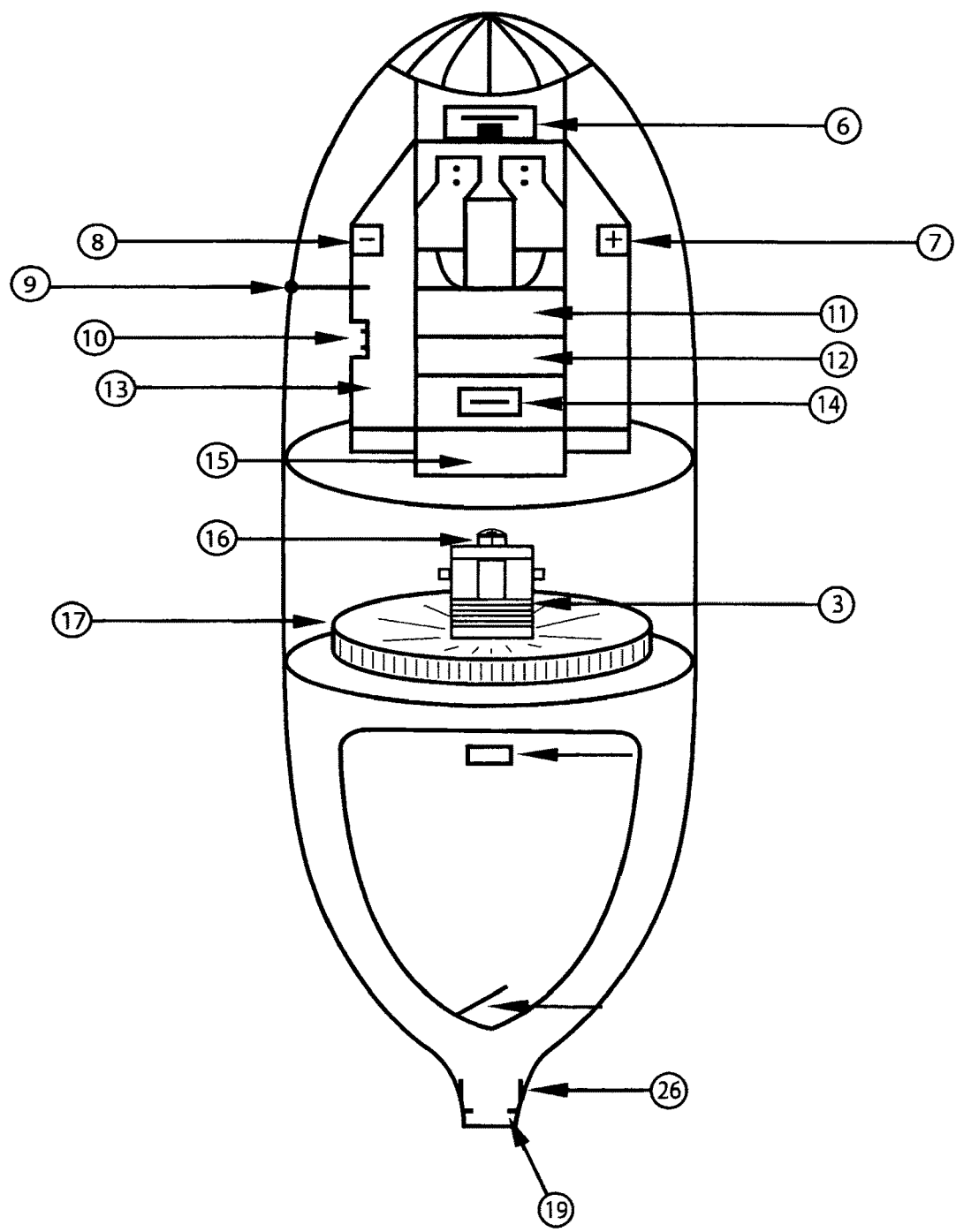
FIG. 9 is a fragmentary drawing of electrical parts
Figure 10:
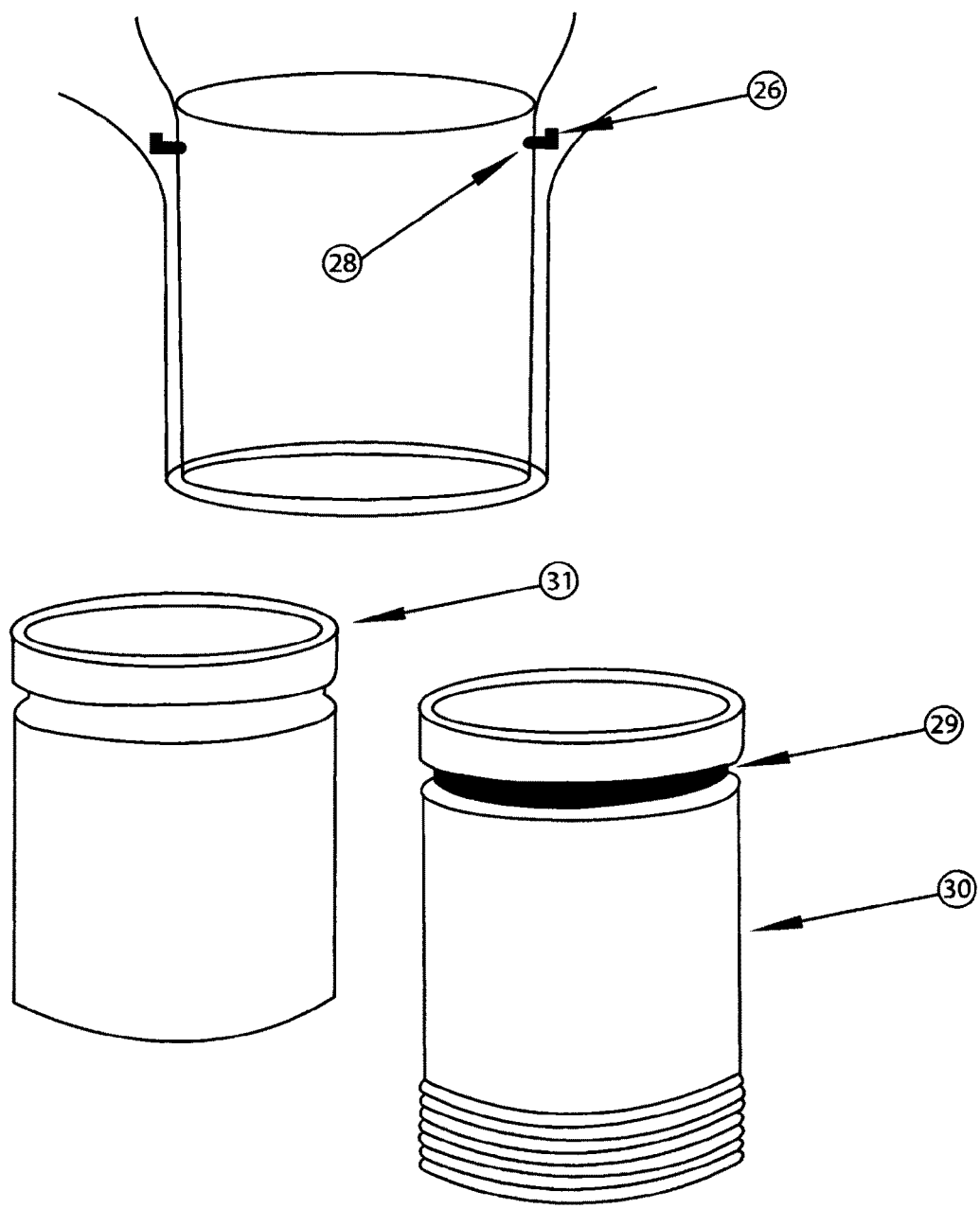
FIG. 10 is an exploded perspective view of the built-in intake port with connectors for the auto switch & ball clip to hold in either the vacuum hose or remote intake hose
Figure 11:
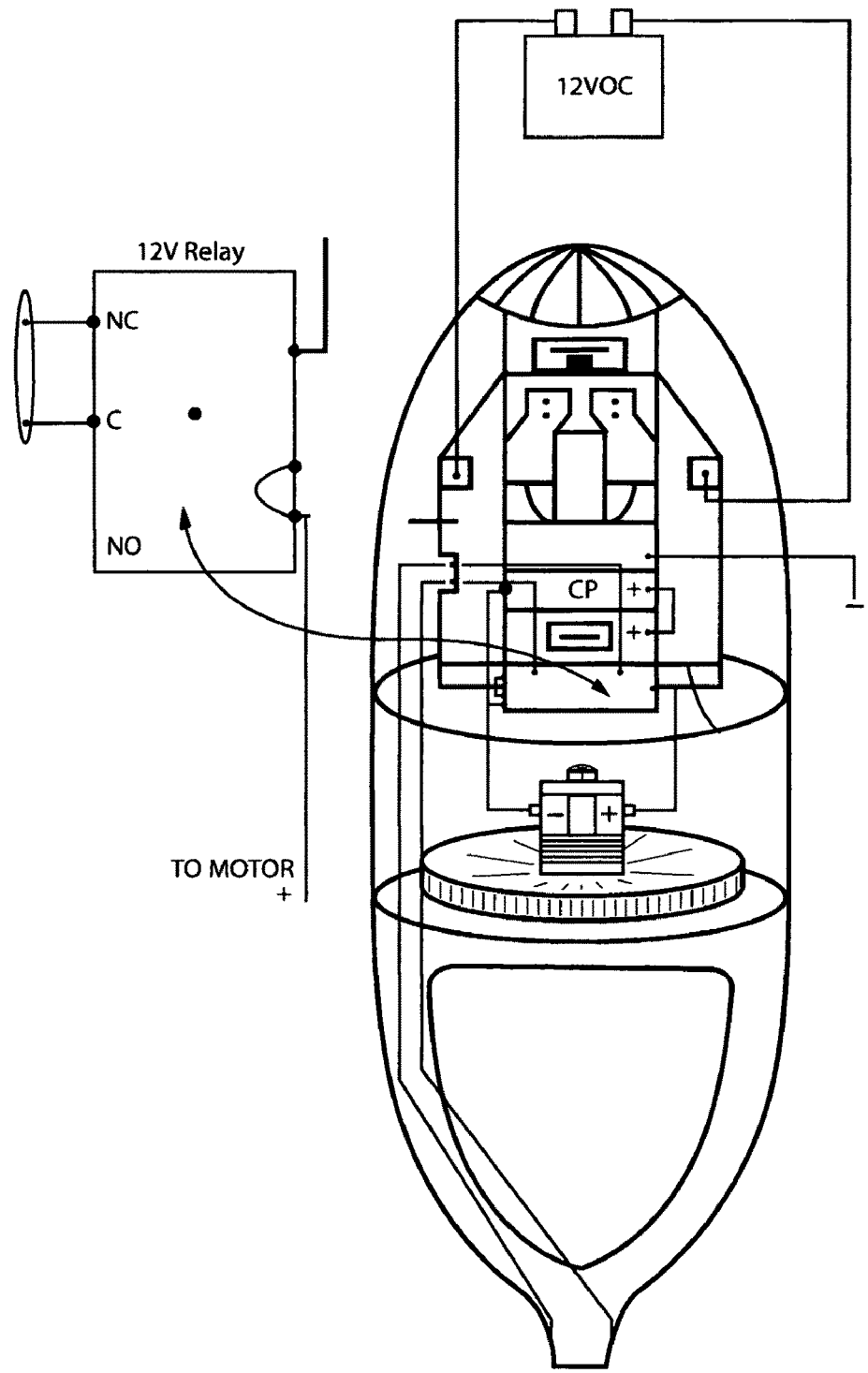
FIG. 11 is a wire diagram
Figure 12:
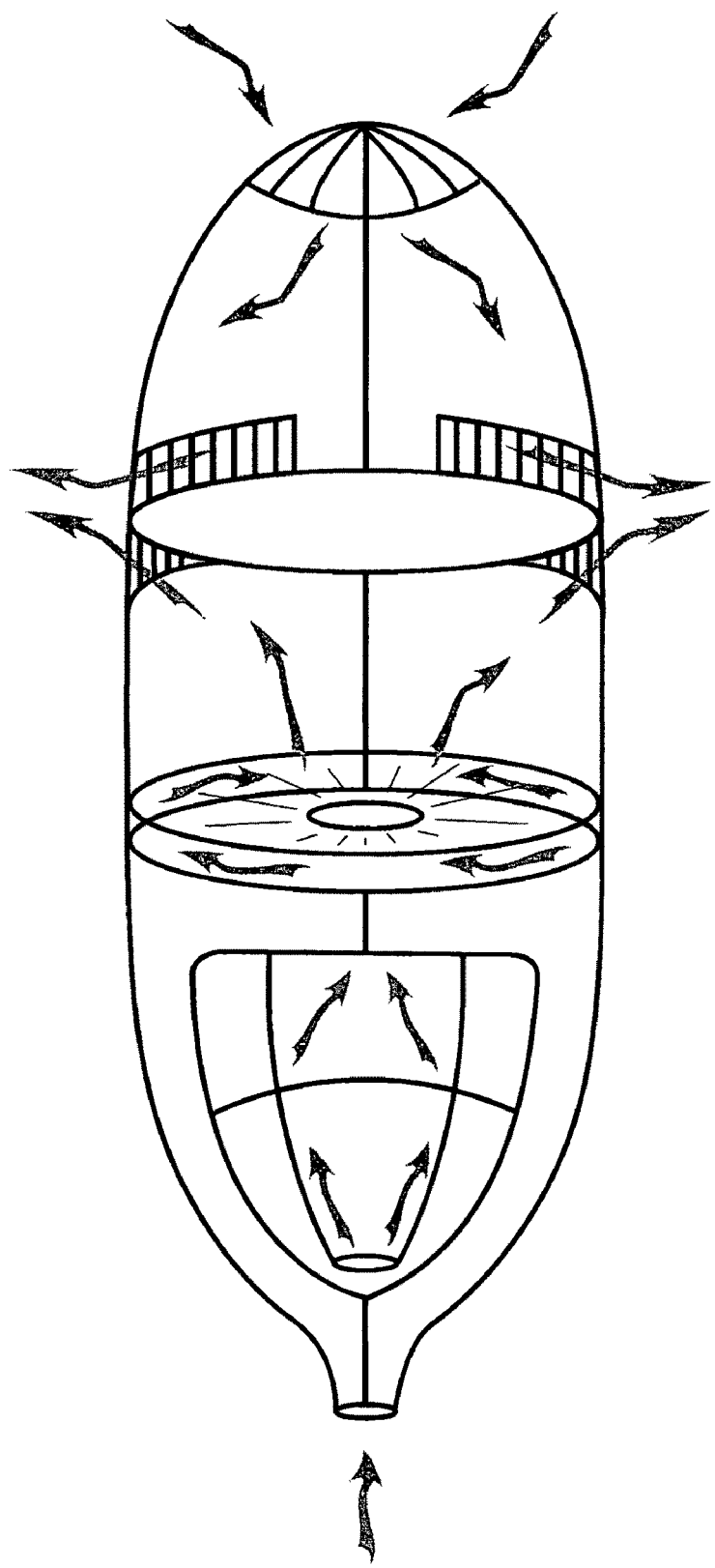
FIG. 12 is showing the direction of air flow through the units vents
Figure 13:
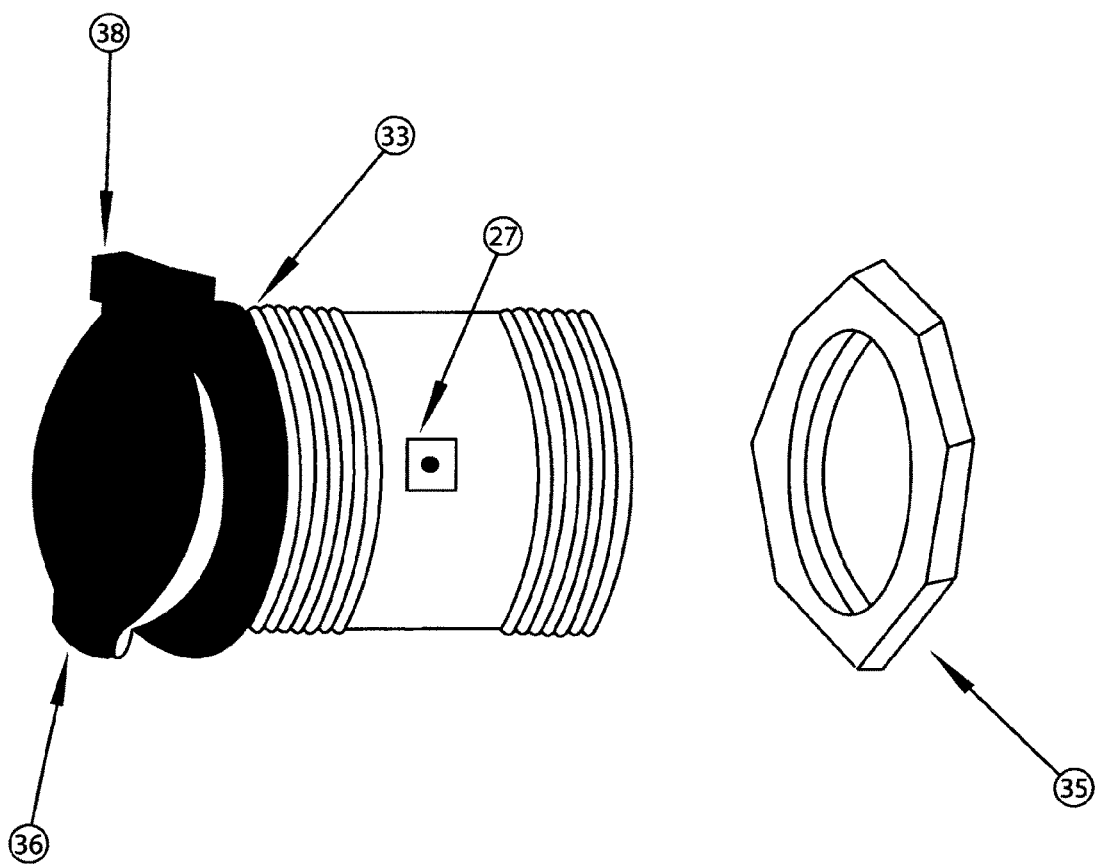
FIG. 13 is a side view of the remote intake port, securing nut & safety washer. Also shows one of the remote intake switch terminals.
Figure 14:
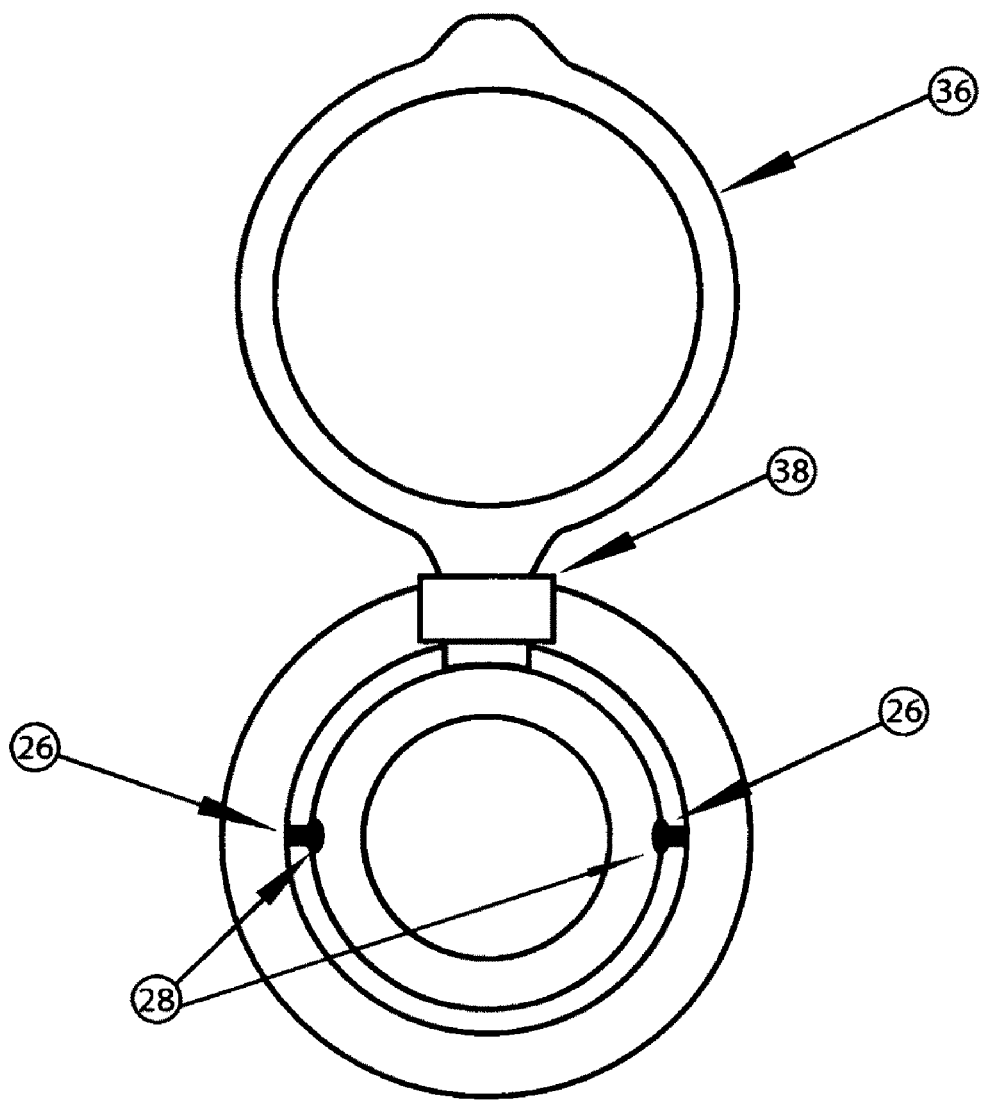
FIG. 14 is a front view of the remote intake port door flap. Also showing ball clips to secure hoses & auto switch terminals connected to ball clips.
Figure 15:
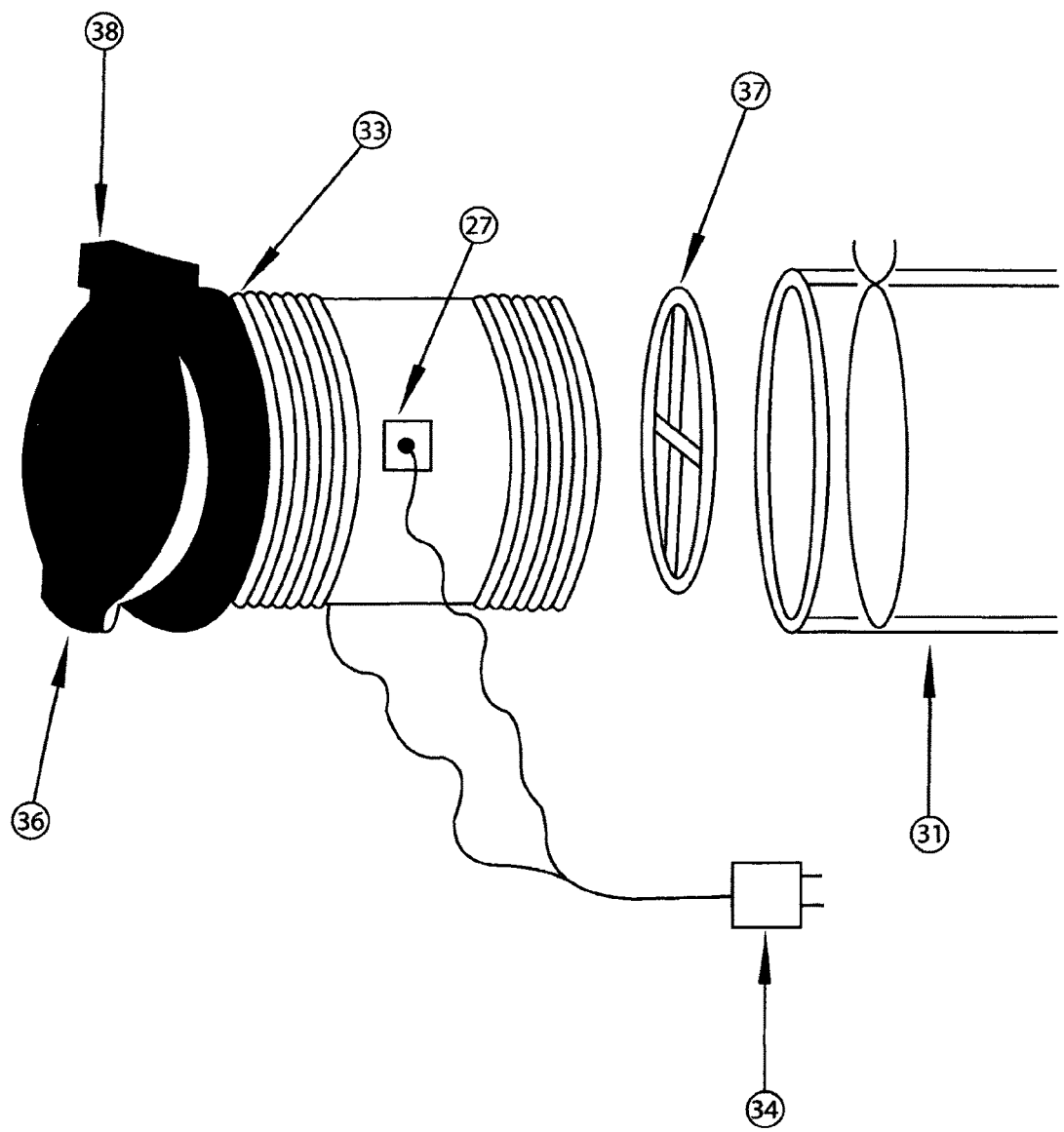
FIG. 15 is an exploded side view of the remote intake port connected to the remote intake hose using a pressure clip also showing the plug connected to the auto switch terminals.
Figure 16:
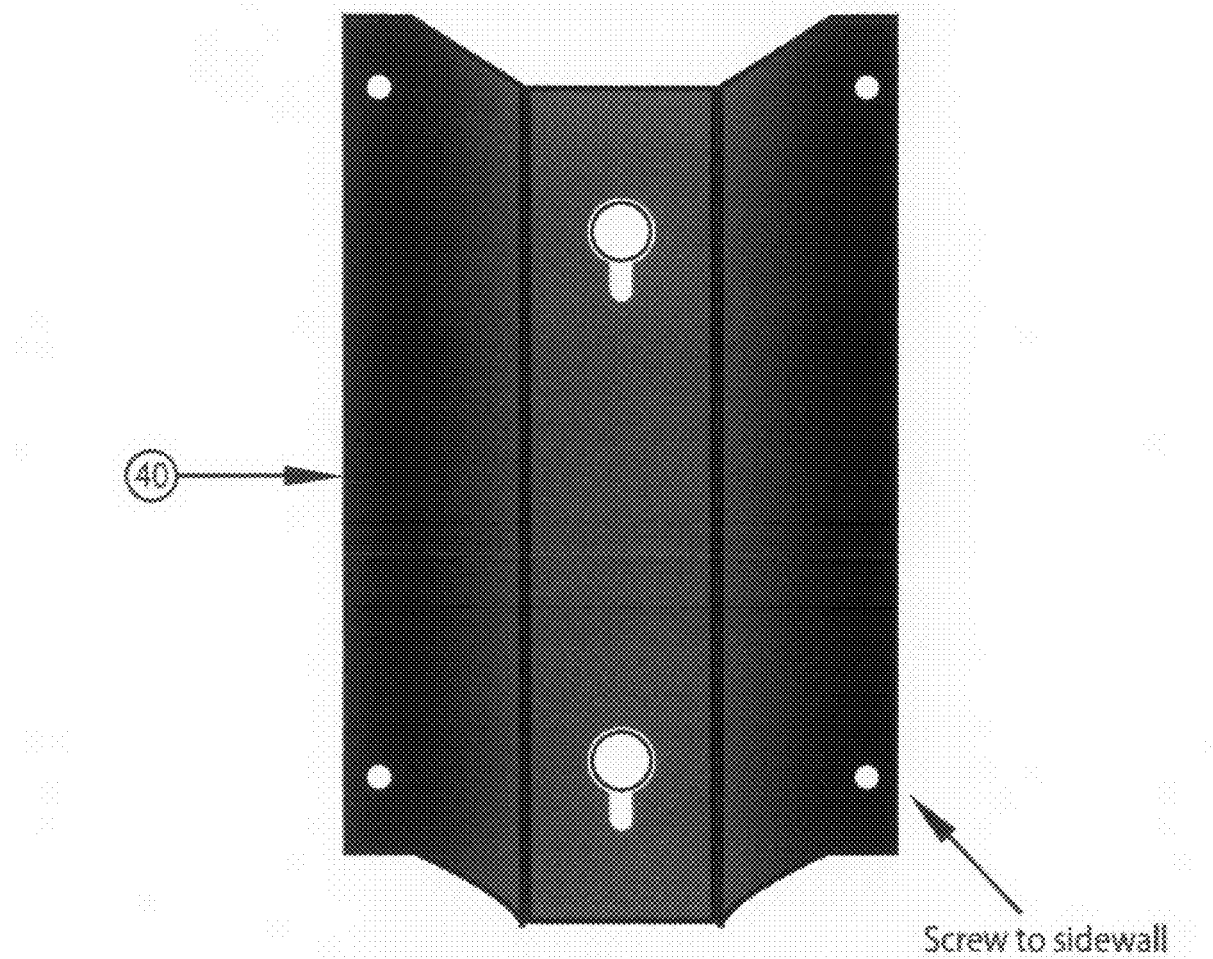
FIG. 16 is a front view of the units mounting bracket
Figure 17:
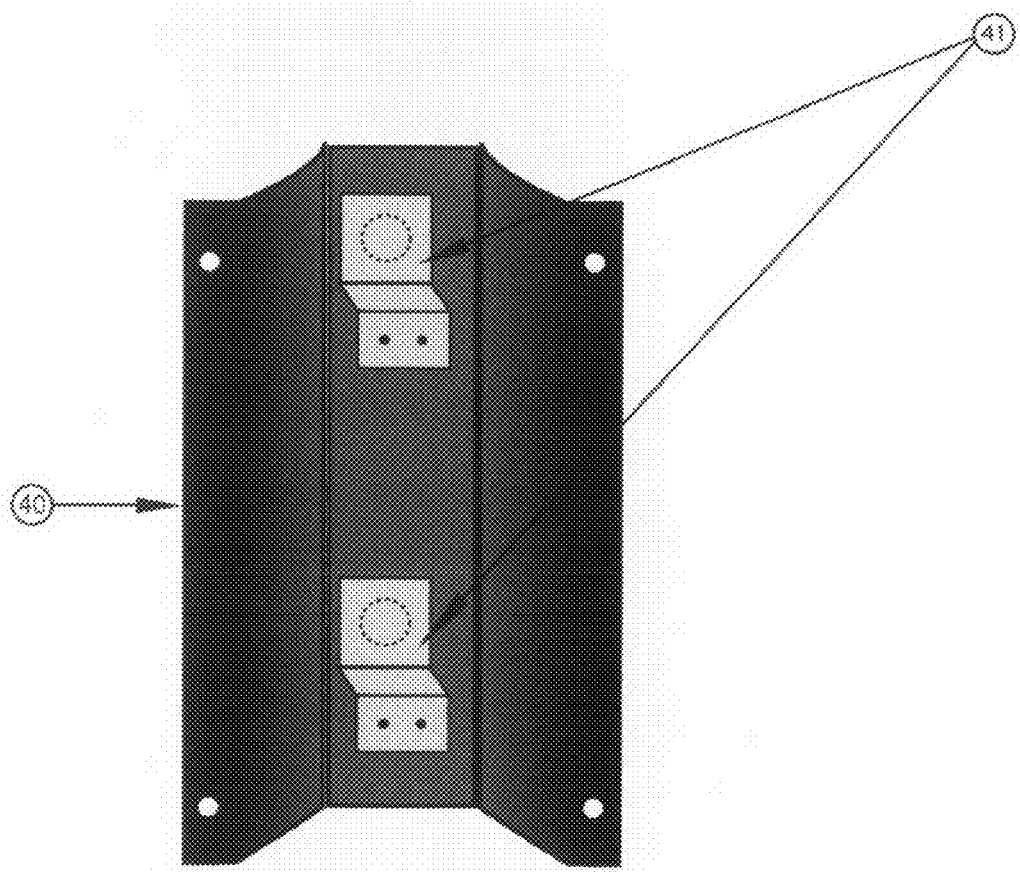
FIG. 17 is a back view of the units mounting bracket
Figure 18:
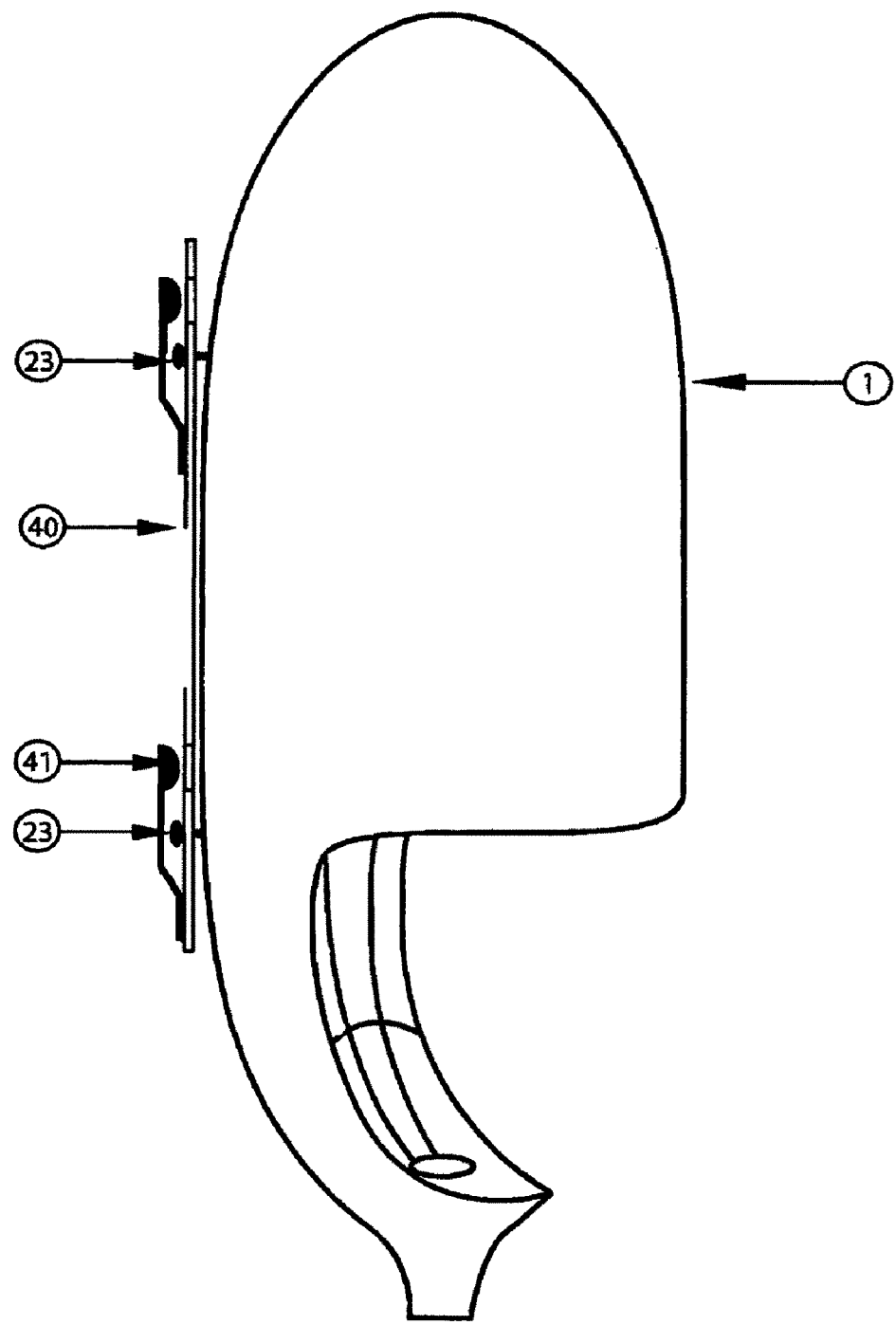
FIG. 18 is a side view of the unit connected to the mounting bracket
Figure 19:
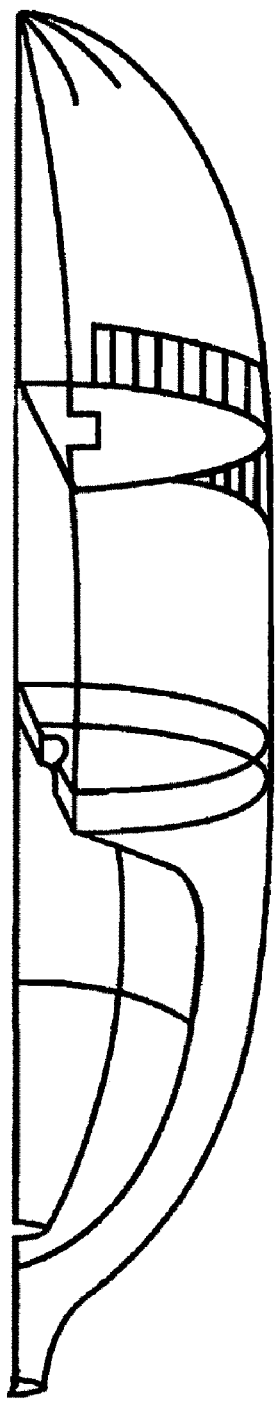
FIG. 19 is a right side view of the housing to hold all components
Figure 20:
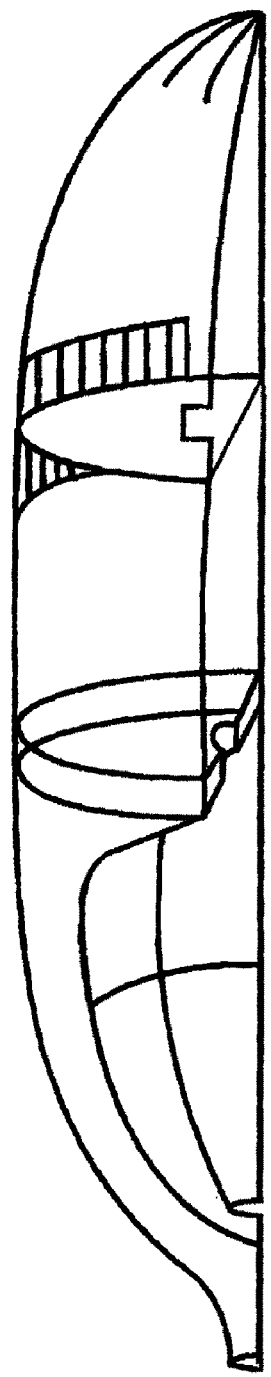
FIG. 20 is a left side view of the housing to hold all components
Figure 21:
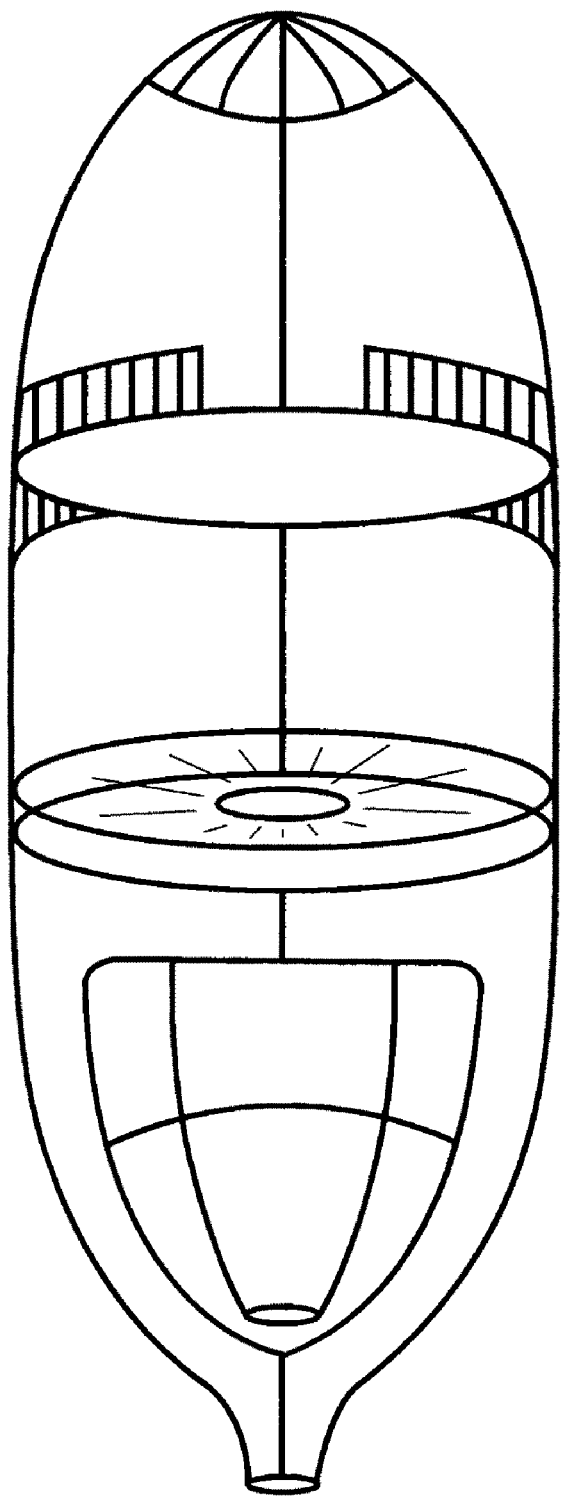
FIG. 21 is a front view of the housing containing all components
Figure 22:
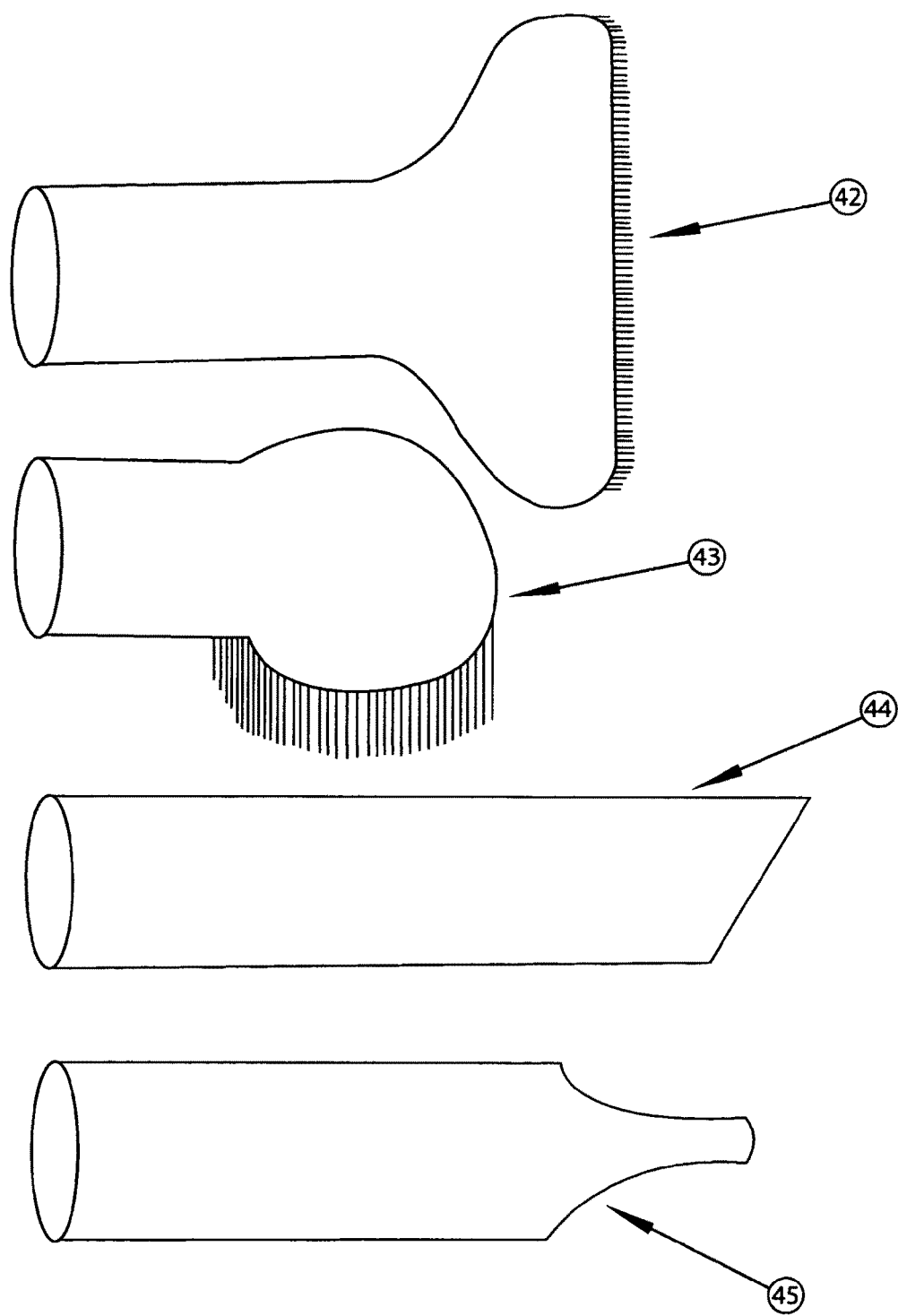
FIG. 22 is an assortment of different attachments for the end of the vacuum hose for different surfaces

In view of the forgoing disadvantages inherent in the known types of vacuum cleaning systems for vehicles now present. This invention simplifies installation by installing all of its components in one mountable unit. More specifically, this invention provides a vacuum cleaner having a built-in inverter, an AC vacuum generating motor, dirt cup and filter in one housing. Other central vacuums for vehicles have scattered parts, hoses and wires running throughout the vehicle that makes installation impossible. This invention allows everyone to install a vacuum unit in their vehicle with ease.

DESCRIPTION OF INVENTION

1. This is a plastic housing consistent of all components
2. Will change 12 Volts DC from the power source to 110 Volts AC to power the suction Fan Motor
3. Will run a fan in a closed compartment for suction to occur
4. The dirt cup will house the Filter & Screen to allow dust & dirt to get trapped in the Dirt Cup
5. The In-Take Vent is where air will be sucked through to cool the inverter
6. The Inverter Fan cools the Inverter
7. Positive DC Terminal is where you connect the #2 AWG wire coming from the positive side of the power source
8. Negative DC Terminal is where you connect the #2 AWG wire coming from the negative side of the power source
9. The Grounding Screw is where you connect the ground wire from the chassis of the vehicle
10. This outlet is where you plug in the plug from the Remote Switch which is connected to the Remote In-Take Port
11. Fuse Panel is where you access the fuses if they need to be replaced
12. Control Panel is where the function of the IVAC is displayed
13. Mother Board is where Inverter components are located such as capacitors, coils & other electronic components
14. The Master ON/Off Switch will activate and deactivate the built-in & remote auto switch
15. AC Relay will switch vacuum on/off when Built-in Auto Switch or Remote Auto Switch is activated by the Vacuum Hose
16. Motor Fan is a fan used to cool the AC motor
17. Compartment where air will spin creating suction for vacuum
18. Release Button will release the dirt cup from the IVAC for easy emptying
19. This is where the vacuum will suck air from when you connect either the Remote In-Take Hose or the Vacuum Hose
20. The Air Flap will open allowing dirt & dust to enter the Dirt Cup when vacuum is in operation. The Air Flap will close when the vacuum stops running
21. The Filter collects dirt, dust & allergens
22. The Screen protects the Filter from getting clogged by larger objects 23. The Mounting Pins are connected to each other inside the IVAC making the pins strong enough to hold the IVAC to the Mounting Bracket
24. The Inverter Exhaust Vent is where the exhaust will go from the Inverter Fan
25. This is where the Vacuum Exhaust will leave the IVAC
26. This is a Built-In Auto Switch when the vacuum hose is plugged into the air-intake it will turn on the IVAC and shut off the IVAC when the Vacuum Hose is unplugged
27. This is where you connect the wires from the remote plug so that the Remote In-Take can be moved to a convenient location
28. This is what will hold the Vacuum Hose or Remote In-Take Hose into the IVAC In-Take Port
29. This is the metal ring connected to the Vacuum Hose that will make a connection to the Ball Clips which are directly connected to the Built-In Auto Switch or Remote Auto Switch Terminals
30. Vacuum Hose which is used to connect to the In-Take Port or Remote In-Take Port used for vacuuming and connecting various attachments
31. This will connect the Remote In-Take Port to the In-Take Port of the IVAC, it will clip into the IVAC with Ball Clips but has no metal ring to make an electrical connection
32. This clip will connect the Remote In-Take Hose to the Remote In-Take Port
33. The Remote In-Take Port will be installed in a convenient location in the interior of the vehicle to make vacuuming easier
34. This plug plugs into the outlet on the IVAC to connect the Remote-Auto Switch
35. This will hold the Remote In-Take Port in place
36. The Dorr Flap will cover the Remote In-Take Port
37. This will stop large objects from getting caught in the Remote In-Take Hose
38. Spring Loaded Hinge will automatically shut Door Flap
39. The power source from the vehicle
40. To mount the IVAC to the vehicle
41. Mounted to back of Mounting Bracket to lock in Mounting Pins
42. Attachment for carpets & upholstery
43. Attachment for getting between seats & hard to reach areas
44. Attachment for dusting dashboard
45. Attachment for cleaning vents on dashboard

DETAILED DESCRIPTION OF THE INVENTION

The present invention is a single mountable unit 1 comprising of a fan cooled direct current to alternating current inverter 2 a fan cooled alternating current vacuum generating motor 3 which is connected to a suction fan compartment 17 to create suction through a removable dirt cup 4 with a release button 18 containing a washable, removable filter 21 and screen 22 assembly.

The unit 1 can be mounted in any vehicle consisting of a 12-volt direct current power source 39. The unit 1 can be mounted horizontally or vertically. The units mounting bracket 40 can be mounted to the vehicles interior compartment or trunk using corrosive resistant screws. The unit 1 is connected to the mounting bracket 40 by lining up the mounting pins 23 to the holes on the mounting bracket 40. Pushing the unit in and down to lock the mounting pins 23 to the locking clips 41 on the mounting bracket 40. The unit has a motherboard 13, which has a control panel 12 with a display to indicate reverse polarity, over temperature and low voltage. The unit 1 has a master on/off switch 14 and an accessible fuse panel 11 and an alternating current relay switch 15 that controls the remote auto switch 27. The unit 1 has a positive direct current terminal 7 and a negative direct current terminal 8 to receive wires from the power source 39 of the vehicle. The unit 1 has a grounding screw 9 to receive a chassis ground wire from the chassis of the vehicle. The unit 1 has a built-in intake port 19 with a built-in auto switch terminal 26 which will turn on the unit 1 when the vacuum hose 30 is plugged in and shut off when the vacuum hose 30 is unplugged. The built-in auto switch terminals 26 are connected to the ball clips 28 which make a connection with the metal ring 29 on the vacuum hose 30 activating the auto switch terminals 26. The ball clips 28 also hold the vacuum hose 30 in place. The unit 1 also has a remote intake port 33 with a spring loaded hinge 38 door flap 36 which will show in the interior of the vehicle. The remote intake port 33 can be installed in a convenient location in the interior of the vehicle and held in place with a connecting nut 35. The remote intake port 33 is connected to the unit 1 by a remote intake hose 31. The remote intake hose 31 is plugged into the units' built-in intake port 19 and held in place by the ball clips 28. The remote intake hose 31 will not activate the auto on/off switch because it does not have a metal ring 29 like the vacuum hose 30. The other end of the remote intake hose 31 is connected to the remote intake port 33 with a safety washer 37 and a locking clip 41. The remote intake port 33 auto switch terminal 27 is connected to the unit 1 by the plug for remote switch 34 to the unit's outlet for remote switch plug 10. This make the remote intake port 33 have a built-in auto switch terminal 26 which will turn on the unit 1 when vacuum hose 30 is plugged in and turn off the unit when the vacuum hose 30 is unplugged.

The unit's airflow generated from the suction fan compartment 17 will flow in the intake port 19 through the air flap 20 on the dirt cup 4 through the screen 22 and filter 21 and out the vacuum exhaust vent 25 trapping dirt and debris in the dirt cup 4.

The unit's airflow generated from the inverter fan 6 will enter through the intake vent 5 and exit through the inverter exhaust vent 24

The airflow generated from the motor cooling fan 16 will exit through the vacuum exhaust vent 25. The unit 1 will have various attachments—vacuum brush attachment 42, extension attachment 43, dusting attachment 44, and extension attachment for vacuuming dashboard vents 45.

What I claim as my invention is:

1. A central vacuum cleaning unit for a vehicle, comprising:

a cylindrical body having a generally spheroidal first end and a generally spheroidal second end;

an in-take port on a tip of the second end;

a removable dirt cup configured and arranged to attach to the body and having a surface that generally conforms to the spheroidal second end of the body, the dirt cup in fluid communication with the in-take port;

a suction fan compartment adjacent to the dirt cup;

an alternating current vacuum motor adjacent to the dirt cup the vacuum motor configured and arranged to draw air up through the in-take port and through the dirt cup and force the air out of the inverter exhaust port;

a direct current to alternating current inverter contained in the first end of the body and adjacent to the vacuum motor;

an inverter exhaust port in the body adjacent to the inverter;

an in-take vent on a tip of the first end; and an inverter fan adjacent to the in-take vent and the inverter, the inverter fan configured and arranged to draw air in through the in-take vent, force the air across the inverter and out of the inverter exhaust port.

2. The central vacuum cleaning unit of claim 1, further comprising a remote intake hose connected to the in-take port and a remote intake port connected to the remote intake hose.

3. The central vacuum cleaning unit of claim 2, further comprising a control panel with a master on/off switch that activates an auto switch in the remote intake port that turns the unit on when a vacuum hose is plugged in to the remote intake port and shuts the unit off when the vacuum hose is unplugged from the remote intake port.

4. The central vacuum cleaning unit of claim 1, further comprising an in-take hose that connects from the unit to the in-take port.

5. The central vacuum cleaning unit of claim 1, further comprising an operation indication display on the body.

6. The central vacuum cleaning unit of claim 1, further comprising an accessible fuse panel on the body.

7. The central vacuum cleaning unit of claim 1, further comprising a screen and a filter contained in the removable dirt cup.

8. The central vacuum cleaning unit of claim 2, further comprising a safety washer to stop large objects from clogging the remote intake hose.

9. The central vacuum cleaning unit of claim 3, wherein the vacuum hose includes a metal ring to make an electrical connection to activate the auto switch.

10. The central vacuum cleaning unit of claim 1, wherein the in-take port includes a built-in auto switch and ball clips to secure a vacuum hose.

11. The central vacuum cleaning unit of claim 3, wherein the remote intake port includes a built-in auto switch and ball clips to secure the vacuum hose.

12. The central vacuum cleaning unit of claim 1, further comprising an air flap to stop dirt from falling out of the removable dirt cup.

* * * * *